(12) United States Patent
Blanpain et al.

(10) Patent No.: US 9,511,852 B2
(45) Date of Patent: Dec. 6, 2016

(54) DEVICE FOR COUPLING AN ACTUATOR FOR CONTROLLING THE LANDING GEAR OF AN AIRCRAFT

(75) Inventors: Thierry Blanpain, Velizy Villacoublay (FR); Dominique Ducos, Velizy Villacoublay (FR); Edouard Campbell, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 35 days.

(21) Appl. No.: 14/238,534

(22) PCT Filed: Sep. 7, 2012

(86) PCT No.: PCT/EP2012/067563
§ 371 (c)(1),
(2), (4) Date: Apr. 2, 2014

(87) PCT Pub. No.: WO2013/034728
PCT Pub. Date: Mar. 14, 2013

(65) Prior Publication Data
US 2014/0209738 A1    Jul. 31, 2014

(30) Foreign Application Priority Data
Sep. 9, 2011  (FR) ..................... 11 58049

(51) Int. Cl.
*B64C 25/20* (2006.01)
*B64C 25/26* (2006.01)
*B64C 25/62* (2006.01)
*B64C 25/58* (2006.01)

(52) U.S. Cl.
CPC .............. *B64C 25/20* (2013.01); *B64C 25/26* (2013.01); *B64C 25/58* (2013.01); *B64C 25/62* (2013.01)

(58) Field of Classification Search
CPC ....... B64C 25/20; B64C 25/26; B64C 25/58; B64C 25/62
See application file for complete search history.

(56) References Cited

U.S. PATENT DOCUMENTS 4,355,773 A * 10/1982 Masclet .................. B64C 25/14
244/102 R

FOREIGN PATENT DOCUMENTS

DE      729 167 C    12/1942
GB      496 080 A    11/1938

OTHER PUBLICATIONS

International Searching Authority; English Translation of the Written Opinion for International Application No. PCT/EP2012/067563; Sep. 3, 2014.*

* cited by examiner

*Primary Examiner* — Tien Dinh
*Assistant Examiner* — Michael A Fabula
(74) *Attorney, Agent, or Firm* — Sughrue Mion, PLLC

(57) ABSTRACT

A device for coupling an actuator for operating an aircraft undercarriage to an aircraft structure. The device comprises a lever having a first end for hinging to the structure of the aircraft, and a second end to which the actuator is hinged, a pre-loading structure acting on the lever to urge it towards a stable rest position that is occupied by the lever in the absence of any force transiting through the actuator; and an abutment structure defining at least one working position for the lever when the actuator is activated.

10 Claims, 2 Drawing Sheets

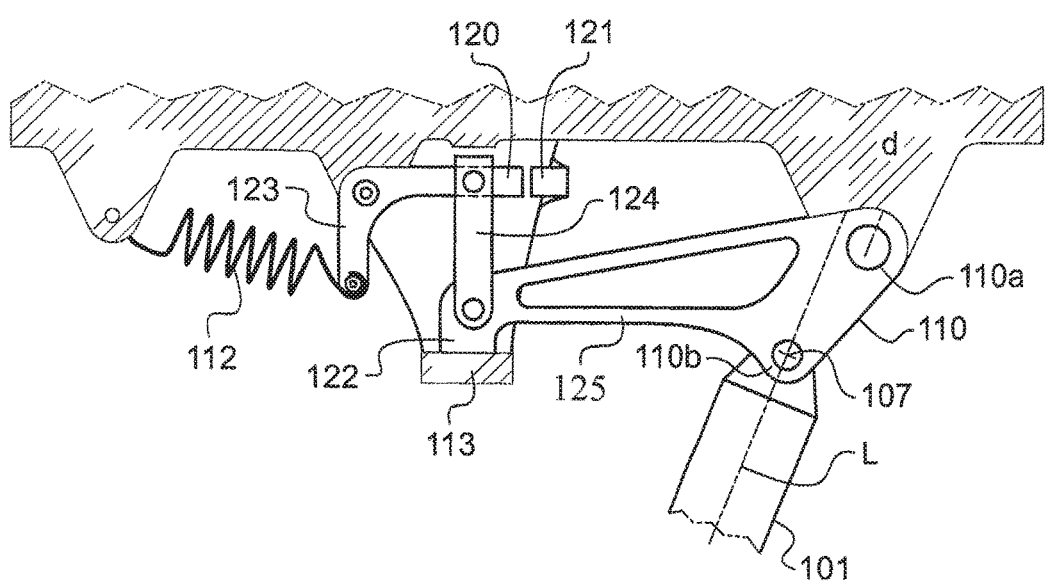

DEVICE FOR COUPLING AN ACTUATOR FOR CONTROLLING THE LANDING GEAR OF AN AIRCRAFT

CROSS REFERENCE TO RELATED APPLICATIONS

This application is a National Stage of International Application No. PCT/EP2012/067563 filed Sep. 7, 2012, claiming priority based on French Patent Application No. 11 58049 filed Sep. 9, 2011, the contents of all of which are incorporated herein by reference in their entirety.

The invention relates to a device for coupling an actuator for operating an aircraft undercarriage.

TECHNOLOGICAL BACKGROUND OF THE INVENTION

Undercarriages are generally hinge-mounted to the structure of an aircraft, e.g. via two ball joints in alignment mounted on the aircraft in order to receive pivots that are secured to the undercarriage. A stabilizer member referred to as a "side-brace" serves, when the undercarriage is deployed, to hold it in the deployed position. The side-brace is then locked in position and triangulates the undercarriage to prevent it from pivoting about the axis defined by the pivots.

An operating actuator, generally a telescopic actuator, is coupled between the structure of the aircraft and the undercarriage in order to operate it. In general, the operating actuator is used actively to cause the undercarriage to rise towards its stowage position, and it is used to slow the downward movement of the undercarriage towards its deployed position.

It is known that when the undercarriage is deployed, it is subjected to forces due either to the deformation of the structure of the aircraft in flight, or else to forces coming up from the ground as a result of the aircraft running on the ground at an airport.

In general, since the actuator is mounted in parallel with the side-brace, it is liable to transmit forces that it must withstand, and it is thus liable to stress its couplings. Nevertheless, if the actuator is not rigid during these stages, as applies for example with a hydraulic actuator having its chambers connected to discharge once the undercarriage has reached its deployed position and been locked therein, then there is no risk of the actuator transmitting forces and thus stressing its couplings to any great extent.

However, that does not apply to an irreversible electromechanical actuator, nor does it apply to a reversible electromechanical actuator as from a certain force and that also presents a high level of internal inertia. An actuator of such a type can present stiffness that is very high, at least on a transient basis, thus constituting a path for passing forces that run the risk of heavily stressing its couplings and its internal components.

OBJECT OF THE INVENTION

An object of the invention is to provide a device for coupling an actuator for operating an aircraft undercarriage and that is compatible with forces being passed upwards by the actuator during stages in which the undercarriage is deployed.

BRIEF SUMMARY OF THE INVENTION

The invention provides a device for coupling an actuator for operating an aircraft undercarriage to an aircraft structure, the device comprising:

- a lever having a first end for hinging to the structure of the aircraft, and a second end to which the actuator is hinged;
- pre-loading means acting on the lever to urge it towards a stable rest position that is occupied by the lever in the absence of any force transiting through the actuator; and
- abutment means for defining at least one working position for the lever when the actuator is activated.

Thus, when the actuator is activated, e.g. in order to raise the undercarriage towards its stowage position, the actuator force acts against the pre-loading means, if necessary, in order to bring the lever towards its working position, such that the actuator is positively positioned relative to the structure of the aircraft. In contrast, when the actuator is not activated, e.g. when the undercarriage is locked in its deployed position, the lever acts like a filter that, on moving from its rest position against the pre-loading means, serves to absorb any return of forces that might be passing via the actuator. This serves to protect the structure of the aircraft and the couplings of the actuator.

The pre-loading means introduce a degree of flexibility that prevents unwanted forces passing upwards via the actuator, with this flexibility being eliminated by bringing the lever into abutment when the actuator is activated.

DESCRIPTION OF THE FIGURES

The invention can be better understood with reference to the figures of the accompanying drawings, in which:

FIG. 3 is a diagrammatic view of a device in a second particular embodiment of the invention.

DETAILED DESCRIPTION OF THE FIGURES

Figure 1:
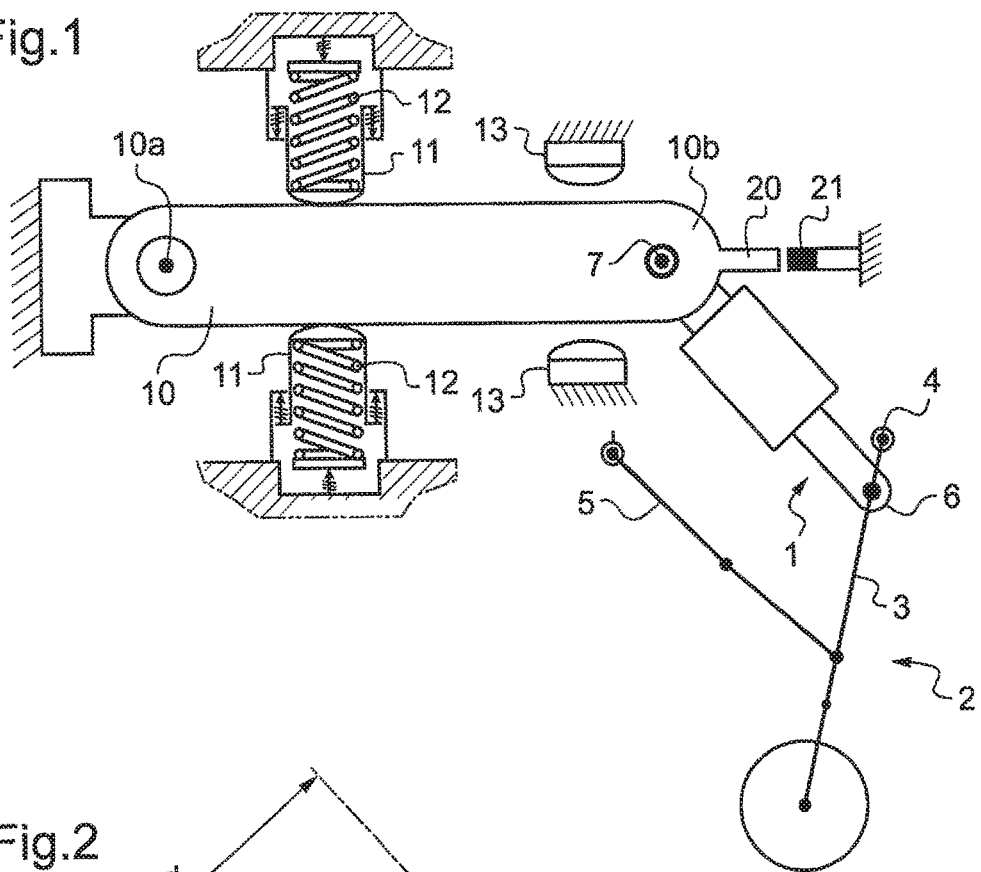
FIG. 1 is a diagrammatic view of a device for coupling an actuator for operating an undercarriage to an aircraft structure in a first particular embodiment of the invention, shown in this figure with the actuator inactive. Naturally, the figure is not to scale, in order to show the device more clearly.

With reference to FIG. 1, the coupling device of the invention serves to couple a telescopic actuator 1 to an aircraft structure, the actuator 1 serving to operate an undercarriage 2 for which there can be seen the strut-leg 3 hinged with hinge 4 to the structure of the aircraft, and the side-brace 5 (shown in this figure in the aligned and locked position to hold the undercarriage in the deployed position).

The actuator 1 is hinged at one of its ends 6 to the strut-leg 5 of the undercarriage, and at its other end 7 to the structure of the aircraft via a coupling device of the invention.

This coupling device comprises:

- a lever 10 having one end 10a hinged to the structure of the aircraft, and one end 10b to which the end 7 of the actuator 1 is hinged;
- pre-loading means comprising, in this example, two pushers 11 arranged on either side of the lever 10 to act on each side of the lever 10 and pre-loaded by springs 12 pushing the pushers 11 towards the lever 10 so as to define a stable rest position for the lever, from which it can be moved under the effect of forces passing via the actuator; and
- abutments, in this example external abutments 13 that define working positions of the lever 10 on either side of its rest position, and into which the lever is urged when the actuator is activated.

The operation of the coupling device of the invention is as follows. When the undercarriage is in the deployed and locked position, the actuator (which is not activated) is in parallel with the side-brace and constitutes a potential path for transferring forces, in particular forces coming up from the ground. This can be particularly damaging for the structure of the aircraft or for the actuator itself. The fraction of the force that it is liable to transmit depends on its stiffness. In particular, if the actuator is an electromechanical actuator, it can present a very great stiffness, at least in transient manner, even if it is inactive.

The freedom of the lever 10 to pivot about its rest position under the effect of a force transmitted by the actuator acting against the pre-loading induced by the pushers 11, as made possible by the invention, serves to decrease the apparent stiffness of the actuator and thus to prevent it from transmitting large forces, and as a result the forces pass preferentially via the side-brace 5. In order to make the lever move away from its rest position, it is necessary for the force passing up through the actuator 1 to be greater than the pre-loading induced by the springs 12 on the pushers 11. Naturally, the pivoting of the levers should remain small, and in any event should not cause the lever 10 to move into the working position against one of the abutments 13, since that would cause stiffness to increase suddenly and would enable the actuator once more to pass large forces.

Figure 2:
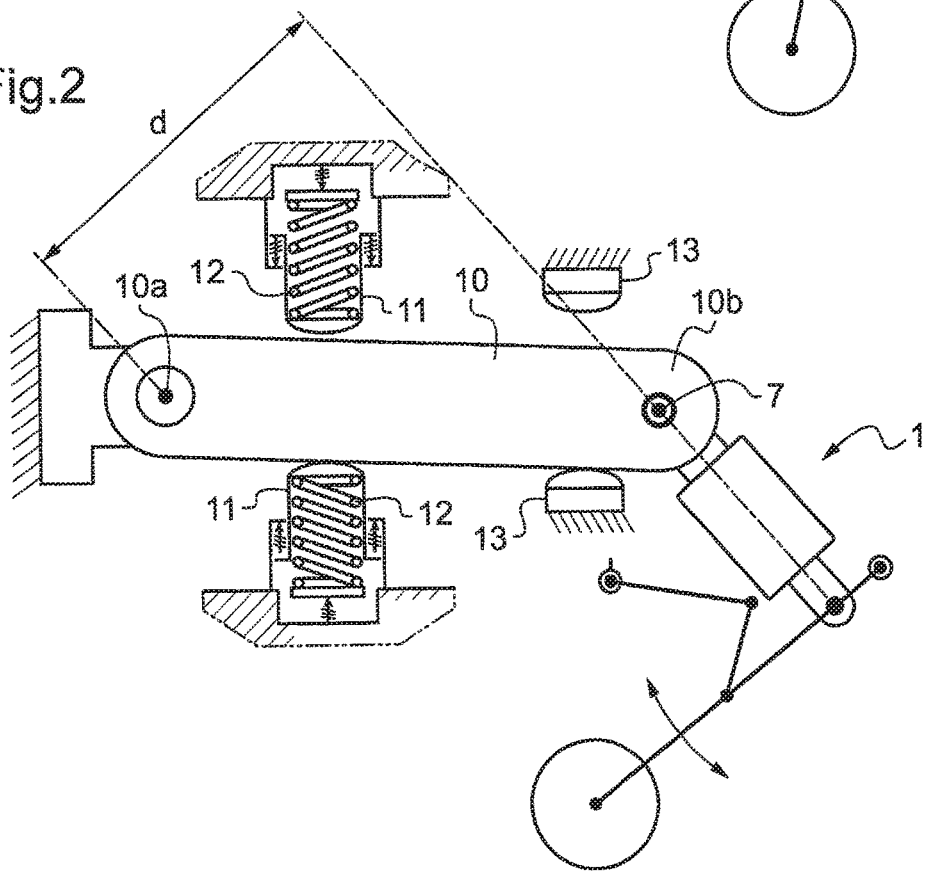
FIG. 2 is a diagrammatic view of the FIG. 1 device, shown while the actuator is active.

In contrast, while the undercarriage is being raised with the help of the actuator as shown in FIG. 2, the force generated by the actuator (represented by the arrow) is sufficient to cause the lever 10 to move into one of the working positions against the pushers 11. The actuator is thus capable of exerting a large raising force, which is transmitted to the structure of the aircraft by the lever 10 pressing against the corresponding abutment 13.

According to a particular aspect of the invention, the lever 10 is fitted with a target 20 that faces a detector 21 in order to detect the position of the lever 10.

With reference to FIG. 3, in which elements similar to those of FIG. 1 are given the same references plus one hundred, the lever 110 of the coupling device of the invention has an extension 125 terminating in a stop 122 that is urged against an abutment 113 by pre-loading means, specifically means comprising a traction spring 112 acting on a crank 123 hinged to the structure of the aircraft, the crank itself being coupled to the lever 110 by a connecting rod 124. The rest position of the lever 110 is thus defined by cooperation between the stop 122 and the abutment 113.

Thus, when the undercarriage is in the deployed position and the actuator is passive, the lever arm d set up on the lever 110 between the line of action L of the actuator and the hinge 107 of the actuator 101 generates a moment tending to move the lever 110 away from its rest position against the action of the spring 112 while the actuator is being subjected to forces due to the undercarriage deforming under the action of forces coming from the ground.

In contrast, when the actuator is activated, it exerts traction on the lever that, because of the lever arm d, tends to confirm the lever 110 in its rest position, which thus also constitutes a working position of the lever 110.

In this embodiment, position detection is performed by means of a target 120 secured to the crank 123 and cooperating with a stationary sensor 121.

Naturally, the invention is not limited to the above description, but on the contrary covers any variant coming within the ambit defined by the claims.

In particular, the hinging of the lever on the structure of the aircraft should be understood broadly. Specifically, the structure of the aircraft on which the lever is hinged could be a portion of the fuselage, of a wing, or indeed of the undercarriage itself. In other words, it is possible for the device of the invention to be interposed between the undercarriage and the actuator.

Furthermore, the springs 12 may be replaced by any other resilient means enabling pre-loading to be installed, where appropriate coupled to dissipater means for damping the movements of the lever.

The invention claimed is:

1. A device for coupling an actuator for operating an aircraft undercarriage to an aircraft structure, the device comprising:
   a lever having a first end for hinging to the structure of the aircraft, and a second end to which the actuator is hinged;
   pre-loading means acting on the lever to urge it towards a stable rest position that is occupied by the lever in the absence of any force transiting through the actuator; and
   abutment means for defining at least one working position wherein the lever contacts said abutment means when the actuator is actuated.

2. A device according to claim 1, wherein the pre-loading means are arranged to define said stable rest position and the abutment means are arranged to define at least one working positions distinct from said stable rest position.

3. A device according to claim 2, wherein the pre-loading means comprise two pushers arranged on either side of the lever to co-operate therewith and to urge the lever towards said stable rest position situated between two working positions defined on either side of said stable rest position by the abutment means.

4. A device according to claim 1, wherein said abutment means are arranged to define a first working position for the lever and a second working position for the lever, and wherein the pre-loading means urge the lever towards the abutment means so that said stable rest position and said first working position coincide.

5. A device according to claim 1, wherein said device further comprises:
   a crank hinged to the structure of the aircraft; and
   a connecting rod;
   wherein the pre-loading means further comprises:
      a spring acting on said crank; and
   wherein the crank is coupled to the lever by means of said connecting rod.

6. An aircraft having a device according to claim 1 for coupling an actuator for operating an aircraft undercarriage.

7. An aircraft having a device according to claim 2 for coupling an actuator for operating an aircraft undercarriage.

8. An aircraft having a device according to claim 3 for coupling an actuator for operating an aircraft undercarriage.

9. An aircraft having a device according to claim 4 for coupling an actuator for operating an aircraft undercarriage.

10. An aircraft having a device according to claim 5 for coupling an actuator for operating an aircraft undercarriage.

* * * * *